UNITED STATES PATENT OFFICE.

GEORG MERLING, OF FRANKFORT-ON-THE-MAIN, GERMANY, ASSIGNOR TO THE FARBWERKE, VORM. MEISTER, LUCIUS & BRÜNING, OF HÖCHST-ON-THE-MAIN, GERMANY, A CORPORATION OF GERMANY.

TRIMETHYL HEXAHYDROÖXYBENZYLANILIN AND PROCESS OF MAKING SAME.

SPECIFICATION forming part of Letters Patent No. 691,157, dated January 14, 1902.

Application filed July 7, 1900. Serial No. 22,771. (Specimens.)

*To all whom it may concern:*

Be it known that I, GEORG MERLING, Ph.D., a citizen of the Empire of Germany, residing at Frankfort-on-the-Main, Germany, have invented certain new and useful Improvements in the Manufacture of Hexahydroöxybenzylamin Bases, of which the following is a specification.

I have found that the amidomethylenecycloketones, having the general formula

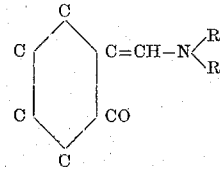

(wherein "R" represents either hydrogen or a fatty or aromatic radical) formed by the action of ammonia or primary and secondary fatty or aromatic amins on formyl or oxymethylenecycloketone of the type

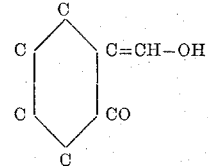

are transformed when treated with reducing agents, preferably with sodium and alcohol, into hydrogenized oxybenzylamin bases of the type

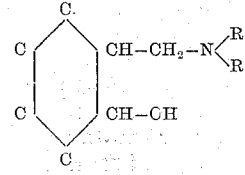

Thus, for instance, anilidomethylenementhone

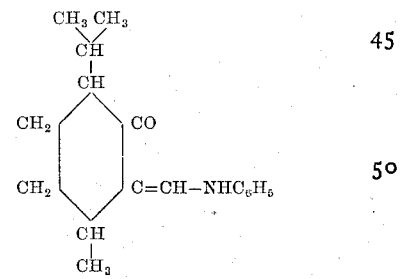

on reduction yields isopropyl-methyl-oxy-hexahydrobenzylanilin

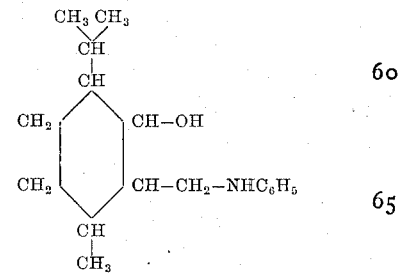

Again, ethylamidomethylenementhone

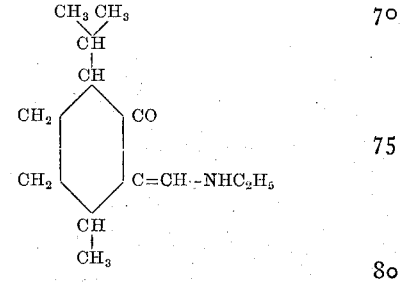

yields isopropyl-methyl-oxy-hexahydrobenzylethylamin

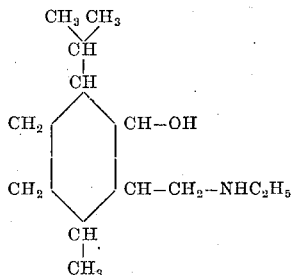

and anilido methylenedihydroisophorone

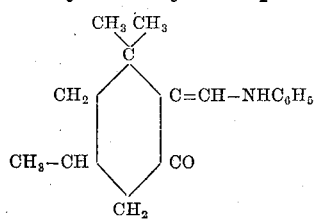

yields trimethyl-oxy-hexahydrobenzylanilin

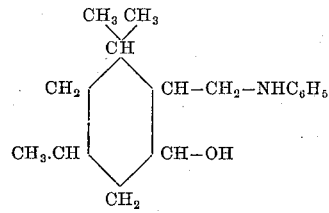

Example I. Transformation of anilidomethylenecamphor (see Claisen: *Ann. Chem.*, 281, 357)

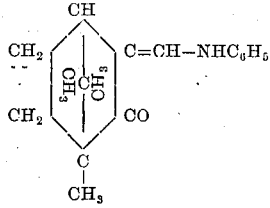

into the hexahydrobase

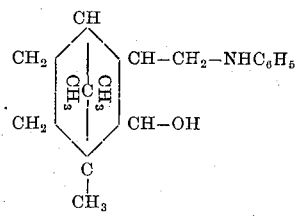

one kilo of anilidomethylenecamphor thoroughly dried (Claisen: *Ann. Chem.*, 281, 358) is dissolved in ten kilos of absolute alcohol distilled in the presence of sodium, and into this solution contained in an enameled vessel provided with an inverted condenser one kilo of sodium is gradually introduced. Toward the end of the reaction heating is necessary. The sodium having disappeared, the alcohol and a small portion of borneol and anilin formed as by-product are distilled with steam. The oxybase remains behind as a brownish very viscous layer of oil contaminated by some camphylglycol formed along with it.

To purify the base, it is dissolved in ether, and the etherial solution is dried in the presence of anhydrous sodium sulfate, and the hydrochlorid is precipitated with hydrochloric-acid gas.

The hydrochlorid of the oxybase is a colorless crystalline powder, soluble with great difficulty in cold water and which easily dissociates when heated with water. The oxybase separated therefrom with soda-lye and distilled *in vacuo* is almost a colorless very viscous syrup boiling-point 231°, (thirty millimeters pressure.)

Example II. Transformation of anilidomethylenedihydroisophorone:

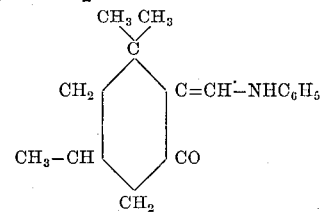

into trimethyl-hexahydro-oxy-benzylanilin:

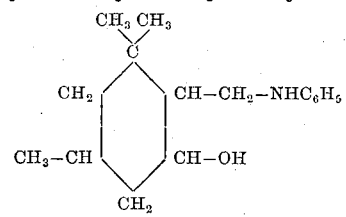

This compound is readily soluble in alcohol, ether, and benzene.

First. Manufacture of oxymethylenedihydroisophrone:

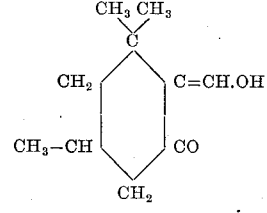

The hitherto unknown oxymethylenedihydroisophorone is easily obtained from pure dihydroisophorone (see Knövenagel: *Ann. Chem.*, 297, 198) by introducing ninety-nine parts, by weight, of it mixed with eighty-four parts of formic acid amylester into 48.1 parts of finely-pulverized sodiumethylate dissolved in three hundred parts of absolute ether and contained in a vessel provided with an inverted condenser. The liquid becomes heated by itself, while the sodiumethylate quickly dissolves. If the liquid boils too fast, the reaction has to be moderated by introducing the vessel into ice-water. After about fifteen minutes the solution solidifies to a crystalline paste of oxymethylenedihydroisophoronesodium. After standing for twelve hours five hundred parts of water are added and the etherial solution is separated from the alkaline layer, which is extracted by shaking with ether. From the alkaline solution dilute acetic acid precipitates the oxymethylenedihydroisophorone as a yellowish layer of oil, which is extracted with ether and after being washed several times with small quantities of water is dried in the presence of sodium sulfate. The ether being filtered, the oxymethylenedihydroisophorone remains behind as a yellow oil boiling *in vacuo* (twenty-seven millimeters pressure) at 124° without being decomposed. A colorless oil, resembling in odor the oxymethylenementhone. (Claisen: *Ann. Chem.*, 284, 394.)

Second. Manufacture of anilidomethylenedihydroisophorone:

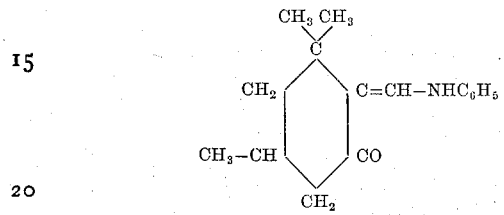

If sixty-five parts of anilin dissolved in acetic acid of thirty per cent. strength are added to a solution of one hundred and ten parts of oxymethylenedihydroisophorone in three hundred parts of methyl alcohol, then the anilidomethylenedihydroisophorone is at once precipitated as a yellow oil, which after a short time solidifies to a yellow crystalline mass. The compound is very readily soluble in all the usual solvents. After being washed with water it is thoroughly dried for the reduction described hereinafter *in vacuo* by means of sulfuric acid.

Third. Reduction of anilidomethylenedihydroisophorone to trimethyl-oxyhexahydrobenzylanilin:

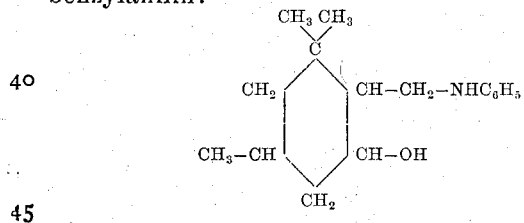

The reduction is carried out exactly in the same manner as that in Example I of anilidomethylenecamphor. The reactions are similar in both cases.

To obtain the base remaing as viscous colorless oil in the distilling vessel in a pure state, the hydrochlorid is precipitated from its dried etherial solution by introducing hydrochloric-acid gas. An excess of hydrochloric acid is to be avoided, as it acts as solvent on the hydrochlorid of the base.

The hydrochlorid of trimethyloxyhexahydrobenzylanilin is a colorless crystalline powder, readily soluble in cold water, which is to be taken into consideration in its manufacture.

The base separated from the hydrochlorid by means of soda-lye is solid. It crystallizes from hot ligroin in needles of the melting-point, 68° to 70°, and boils *in vacuo* (fifteen millimeters pressure) at 221° without being decomposed.

Example III. Transformation of amidomethylenementhone:

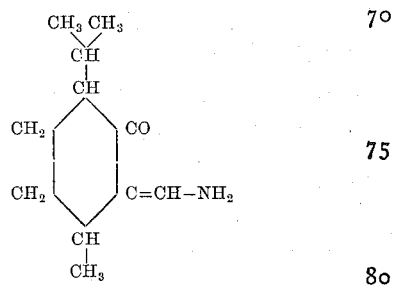

into isopropyl-methyl-hexahydro-oxy-benzylamin

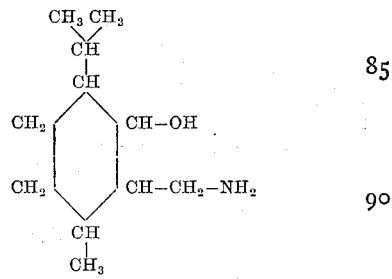

First. Manufacture of amidomethylenementhone:

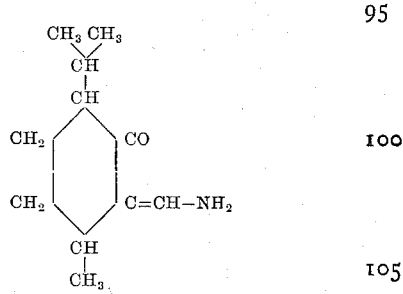

(hitherto unknown.) Oxymethylenementhone (Claisen: *Ann. Chem.*, 281, 394) is readily soluble in aqueous concentrated ammonia. After standing for a short time the solution solidifies to a crystalline paste of the amido compound. The crystals are filtered, washed with water, and thoroughly dried *in vacuo* in the presence of sulfuric acid; melting-point, 115°.

Second. Reduction of amidomethylenementhone to isopropylmethyl-oxy-hexahydrobenzylamin:

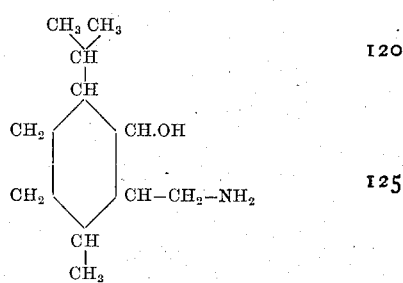

One part of amidomethylenementhone thoroughly dried is dissolved in ten parts of absolute alcohol, and into this solution, contained in a vessel provided with an inverted condenser, is gradually introduced one part of sodium. On the disappearance of the sodium (the reaction has to be accelerated toward the end by heating) the solution is diluted with water and the alcohol is distilled with steam. As the base is somewhat volatile with steam, the reaction is interrupted as soon as the filtrate becomes turbid. The isopropylmethyloxyhexahydrobenzylamin remains in the vessel as a colorless layer of oil. To purify it from small portions of indifferent compounds, the oil is dissolved in ether and the etherial solution is repeatedly extracted with dilute hydrochloric acid. From the solution of the hydrochlorid soda-lye precipitates the base as an oil, which is again extracted with ether and dried in the presence of anhydrous sodium sulfate. After distilling the ether the base remains as a colorless oil, boiling *in vacuo* (thirty millimeters pressure) at 150° to 151°, which slowly solidifies on cooling to a colorous crystalline mass. The base thus obtained is not homogeneous, as experiments have shown. It consists of a mixture of two stereoisomeric modifications, which by the different solubility of their hydrochlorids are easily separated by means of benzene. For this purpose the mixture of the bases of the boiling-point, 150° to 151°, (thirty millimeters pressure,) is dissolved in benzene while introducing an excess of hydrochloric-acid gas. Then the hydrochlorid of one of the modifications is separated, which may be designated as "trans-isopropyl-methyl-oxyhexahydrobenzylamin," while the hydrochlorid of the cis-isopropylmethyl-oxy-hexahydrobenzylamin remains dissolved. The bases separated from the two hydrochlorids are again separately treated in the same manner, and thus a complete separation of the isomers is obtained. Thus it has been proved that the raw base consists of about one-third of trans-base and of two-thirds of cis-base. Both bases solidify at once after distillation *in vacuo* to dazzling white crystalline masses. The cis-isopropylmethyl-oxy-hexahydrobenzylamin boils at 165° to 170° (thirty millimeters pressure) and the trans-isopropylmethyl-oxyhexahydrobenzylamin at 163°, (thirty millimeters pressure.) Both isomers are clearly soluble in dilute mineral acids. In a similar way are manufactured:

First. From the hitherto unknown anilidomethylenementhone (oil) isopropyl-methyl-hexahydro-oxy-benzylanilin:

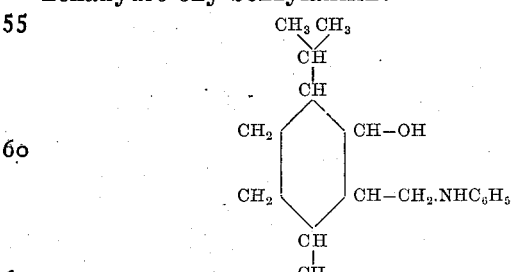

thick oil; boiling-point 247° to 248°, (twenty millimeters pressure.)

Second. From the hitherto unknown dimethylamidomethylenementhone (oil forming a hydrate crystallizing in laminæ) isopropyl-methyl-hexahydro-oxy-benzyldimethylamin:

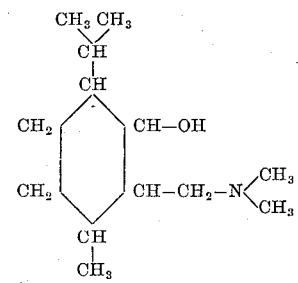

oil; boiling-point 140°, (fourteen millimeters pressure.)

Third. From the hitherto unknown oily ethylamidomethylenementhone isopropylmethyl-hexahydro-oxy-benzylethylamin:

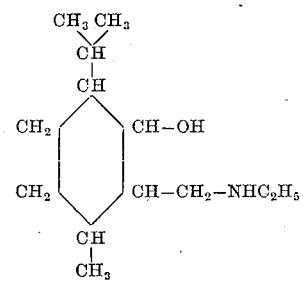

oil; boiling-point 165° to 166°, (nineteen millimeters pressure.)

Fourth. From the hitherto unknown oxymethylene-methylcyclohexanone:

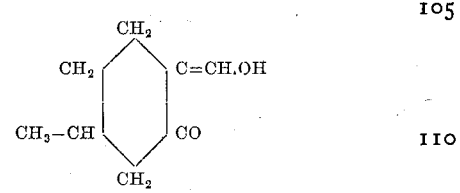

at first by the action of anilin the hitherto unknown anilidomethylene-methylcyclohexanone, yellow crystals; melting-point 170° to 171°, and from this methyl-hexahydro-oxy-benzylanilin

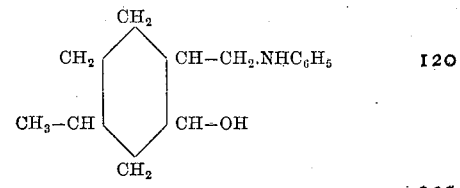

crystals; melting-point 126° to 127°.

The hexahydro-oxybenzylamin bases obtained according to the process of this application are to be employed as preliminary products in the manufacture of odors.

Having now described my invention, what I claim is—

1. The herein-described process of making hexahydro-oxybenzylamin bases of the type:

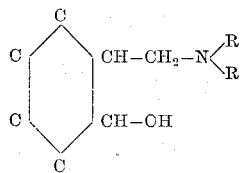

wherein R represents either hydrogen, or a fatty or aromatic radical, which consists in treating amidomethylenecycloketones of the type:

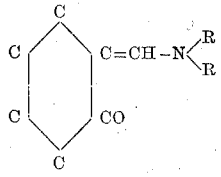

obtained by the action of ammonia upon ketones of the general formula:

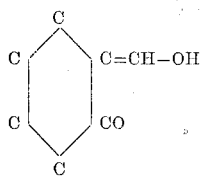

with reducing agents, substantially as set forth.

2. As a new product, the trimethylhexahydro-oxybenzylanilin, having the formula:

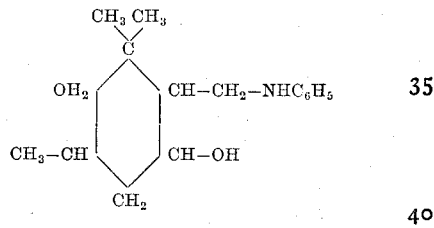

and being in the form of crystals with a melting-point of 68° to 70° centigrade, and boiling at 221° centigrade, (fifteen millimeters pressure,) the compound being readily soluble in alcohol, ether and benzene, substantially as set forth.

In testimony that I claim the foregoing as my invention I have signed my name in presence of two subscribing witnesses.

GEORG MERLING.

Witnesses:
HEINRICH HAHN,
ALFRED BRISBOIS.